(12) United States Patent
Willis et al.

(10) Patent No.: US 8,227,375 B2
(45) Date of Patent: Jul. 24, 2012

(54) GAS ADSORPTION ON METAL-ORGANIC FRAMEWORKS

(75) Inventors: Richard R. Willis, Cary, IL (US); John J. Low, Schaumburg, IL (US); Syed A. Faheem, Huntley, IL (US); Annabelle I. Benin, Oak Forest, IL (US); Randall Q. Snurr, Evanston, IL (US); Ahmet Ozgur Yazaydin, Evanston, IL (US)

(73) Assignees: UOP LLC, Des Plaines, IL (US); Northwestern University, Evanston, IL (US)

( * ) Notice: Subject to any disclaimer, the term of this patent is extended or adjusted under 35 U.S.C. 154(b) by 508 days.

(21) Appl. No.: 12/552,037

(22) Filed: Sep. 1, 2009

(65) Prior Publication Data
US 2010/0069234 A1    Mar. 18, 2010

Related U.S. Application Data

(60) Provisional application No. 61/096,512, filed on Sep. 12, 2008.

(51) Int. Cl.
*B01J 20/22* (2006.01)
(52) U.S. Cl. .................................................. 502/401
(58) Field of Classification Search ................ None
See application file for complete search history.

(56) References Cited

U.S. PATENT DOCUMENTS

| | | | |
|---|---|---|---|
| 6,491,740 B1 * | 12/2002 | Wang et al. | 95/90 |
| 7,411,081 B2 | 8/2008 | Mueller et al. | |
| 7,799,120 B2 | 9/2010 | Yaghi et al. | |
| 2005/0154222 A1 | 7/2005 | Muller et al. | |
| 2007/0068389 A1 | 3/2007 | Yaghi | |
| 2007/0248852 A1 * | 10/2007 | Mueller et al. | 429/17 |
| 2008/0184883 A1 * | 8/2008 | Zhou et al. | 95/127 |

FOREIGN PATENT DOCUMENTS

WO   2004101575 A2   11/2004

OTHER PUBLICATIONS

Chen, "High H2 Adsorption in a Microporous Metal-Organic Framework with Open Metal Sites", Angew. Chem. Int. Ed. 2005, 44, 4745-4749.
Dinca, "Hydrogen Storage in a Microporous Metal-Organic Framework with Exposed Mn2+ Coordination Sites", J. Am. Chem. Soc. 2006, 128, 16876-16883.
Navarro, "Guest-Induced Modification of a Magnetically Active Ultramicroporous, Gismondine-like, Copper(II) Coordination Network", J. Am. Chem. Soc. 2008, 130, 3978-3984.
Peterson, "Neutron Powder Diffraction Study of D2 Sorption in Cu3(1,3,5-benzenetricarboxylate)2", J. Am. Chem. Soc. 2006, 128, 15578-15579.
Rosi, "Rod Packings and Metal-Organic Frameworks Constructed from Rod-Shaped Secondary Building Units", J. Am. Chem. Soc. 2005, 127, 1504-1518.

* cited by examiner

*Primary Examiner* — Melvin C Mayes
*Assistant Examiner* — Bijay Saha
(74) *Attorney, Agent, or Firm* — Mark Goldberg

(57) ABSTRACT

The present invention involves the use of certain metal organic frameworks that have been treated with water or another metal titrant in the storage of carbon dioxide. The capacity of these frameworks is significantly increased through this treatment.

9 Claims, 1 Drawing Sheet

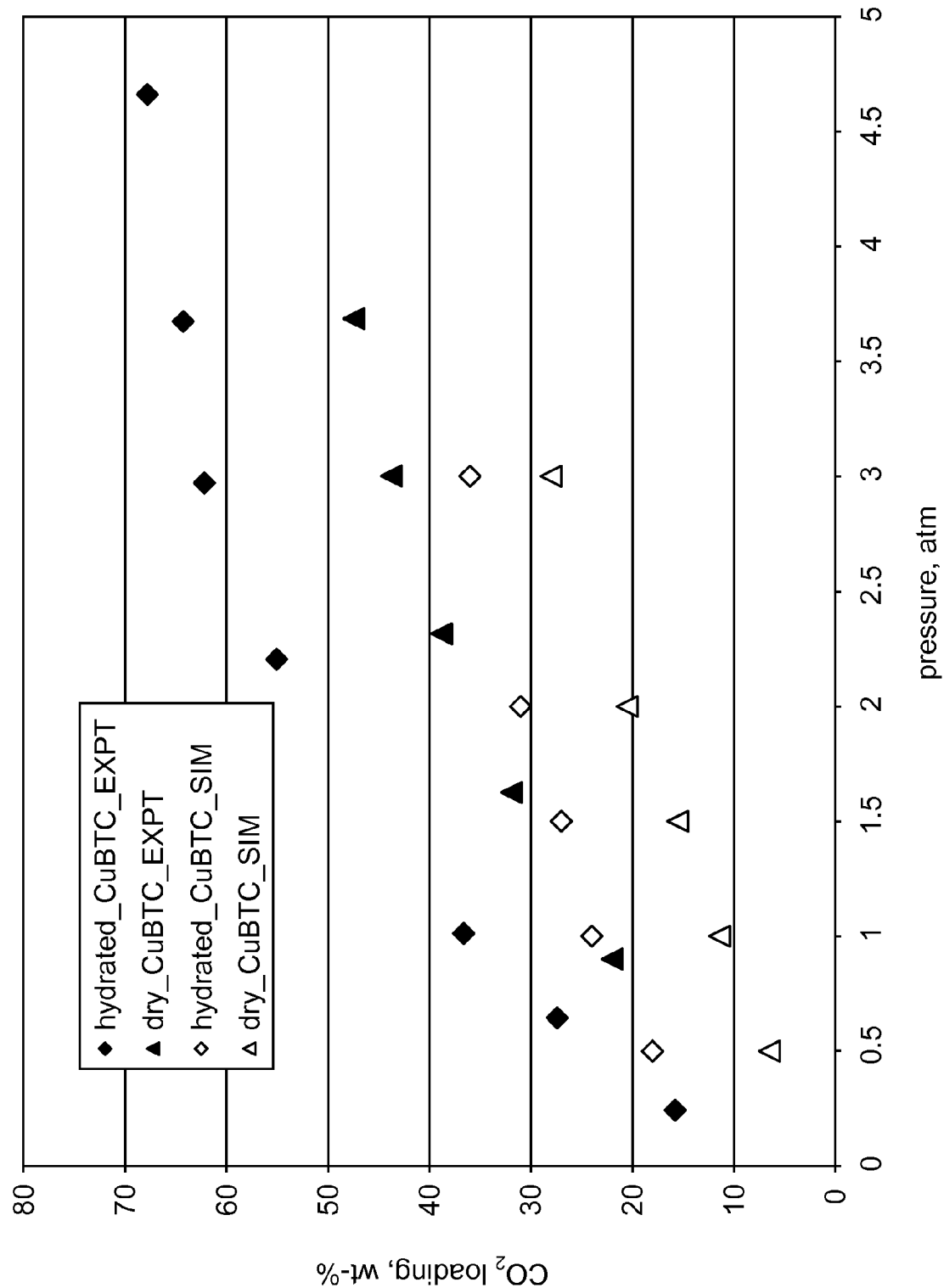

GAS ADSORPTION ON METAL-ORGANIC FRAMEWORKS

CROSS-REFERENCE TO RELATED APPLICATION

This application claims priority from Provisional Application No. 61/096,512 filed Sep. 12, 2008, the contents of which are hereby incorporated by reference.

GOVERNMENT INTERESTS

The U.S. Department of Energy has certain rights in this invention under National Energy Technology Laboratory Award No. DE-FG26-04NT42121.

BACKGROUND OF THE INVENTION

The present invention relates to materials that are used to store gas molecules. More specifically, it relates to metal organic frameworks that have been treated to provide increased storage for carbon dioxide as compared to metal organic frameworks that have not been treated.

Carbon dioxide has been described as having a greater impact upon the environment than any other greenhouse gas due to the amount of carbon dioxide being added to the atmosphere by human activities. Carbon dioxide levels have increased by over 30% since the beginning of the Industrial Revolution. This increase has been calculated by scientists as being associated with a global warming trend and increased acidity of the oceans. About 75% of the increase in carbon dioxide levels is attributed to the burning of fossil fuels with the largest source of carbon dioxide emissions being from coal fired power plants, accounting for a total of about ⅓ of all $CO_2$ emissions in the United States. One way to mitigate the amount of carbon dioxide that is being released is to capture it as it is produced at a coal-fired power plant either for short term use or long term capture and storage. A variety of materials have been tried for artificial carbon sequestration. Mitigation technologies are necessary for the short- and long-term capture and storage of carbon dioxide. Removal of carbon dioxide from the flue exhaust of power plants is commonly accomplished by chilling and pressurizing the exhaust or by passing the fumes through a fluidized bed of aqueous amine solution, both of which are costly and inefficient. Other methods based on chemisorption of carbon dioxide on oxide surfaces or adsorption within porous silicates, carbon, and membranes have been pursued as means for carbon dioxide uptake. Although each of the prior art technologies work to some extent, more cost effective technologies are necessary to cope with the overwhelming amount of carbon dioxide currently generated. The cost of current methods is about $150/ton of carbon. However, the known methods are too expensive to be commercially feasible for expanded use without significant government subsidies.

Metal organic-frameworks (MOFs) are a new class of nanoporous materials that have potential applications in separation processes, catalysis and gas storage. MOFs are synthesized using organic linker molecules and metal joints that self-assemble to form materials with well defined pores, high surface areas, and desired chemical functionalities. Because of these attractive properties, MOFs are promising candidates for $CO_2$ capture. In the present invention, it is now shown that MOF Cu-BTC can be easily tuned to significantly enhance adsorption of $CO_2$ by pre-adsorbing a small amount of water. This tuning for enhanced adsorption of $CO_2$ applies to certain other guest molecules and other MOFs.

In many MOFs, the metal atoms are coordinatively saturated by the organic linkers that are connected to create the framework. However, in some MOFs, metal atoms are partially coordinated by solvent molecules from the synthesis procedure. It is common practice to activate MOFs at elevated temperature to remove the solvent and open up the void space for desired guest molecules. If the evacuation temperature is high enough, all solvent molecules can be removed, including those that are coordinatively bound to framework metal atoms. Removing these coordinated solvent molecules leaves coordinatively-unsaturated, open-metal sites that have been shown to promote high gas uptake, especially for $H_2$ adsorption. Recently, for example, Bae et al. showed that in a carborane-based MOF removal of coordinated dimethylformamide (DMF) increased $CO_2$ and $CH_4$ adsorption and led to high selectivity for $CO_2$ over methane. The open-metal sites in MOFs are reminiscent of the extra-framework cations in zeolites, in that they are expected to create large electric fields and to eagerly bind polar molecules. In zeolites, it is well known that the presence of water significantly decreases the adsorption of $CO_2$ because water competitively adsorbs on the cations, blocking access for $CO_2$. In this work, the opposite effect is found: water bound to open-metal sites substantially increases $CO_2$ adsorption.

Cu-BTC (also known as HKUST-1) is a well-studied MOF first synthesized by Chui et al. The structure is composed of large central cavities (diameter 9.0 Å) surrounded by small pockets (diameter 5.0 Å), connected through triangular-shaped apertures of similar size. The Cu-BTC framework has paddlewheel type metal corners connected by benzene-1,3,5-tricarboxylate (BTC) linkers. Each metal corner has two copper atoms bonded to the oxygens of four BTC linkers. In the as-synthesized material, each copper atom is also coordinated to one water molecule. Metal-organic frameworks (MOFs) are a recent addition to the classes of porous materials and have the potential for providing just such a flexible platform for developing designer adsorbents. MOFs are synthesized by self-assembly of organic ligands and metal oxide clusters. The resulting crystalline materials possess regular porous structures with pore sizes and chemical functionalities that can be manipulated by modifying the metal group. Metal organic frameworks have been found to have the capacity to capture $CO_2$ readily and at high selectivity over other gases such as nitrogen. In US 2007/0068389, there are described a number of MOFs that have the capacity to store $CO_2$. This is a promising technology, and would be even more promising if it had even higher capacity for storage of $CO_2$. Some MOFs possess open metal sites and can coordinate $CO_2$ or other molecules more strongly than typical physisorption. In the present invention, a process has been developed for increasing the gas storage capacity and especially the storage capacity for $CO_2$, certain MOFS, including a MOF called CuBTC, can be made to adsorb more $CO_2$ than in its open-metal site form by simply titrating these open metal sites with water or other molecules before performing the $CO_2$ adsorption measurement. In addition, other molecules can be used instead of or in addition to water to further enhance and/or modify the MOF adsorption performance for $CO_2$ or other gases.

SUMMARY OF THE INVENTION

MOFs are very porous materials that can capture $CO_2$ readily and at high selectivity over other gases such as nitrogen. Typically the adsorption is simple physisorption. Some MOFs possess open metal sites and can coordinate $CO_2$ or other molecules more strongly than typical physisorption. In the present invention it has been found that MOFS with open metal sites can be treated with certain liquids, such as water, to significantly increase the MOF's capacity for carbon dioxide. In particular, a MOF called CuBTC has been made to adsorb more $CO_2$ than in its open-metal site form by being titrated with water or other molecules before performing the $CO_2$ adsorption measurement.

BRIEF DESCRIPTION OF THE DRAWING

The FIGURE shows carbon dioxide adsorption on CuBTC that has been completely activated to be free from guest solvent or other molecules, or "dry" (triangles), and carbon dioxide adsorption on CuBTC that has been loaded with up to 10 wt % water (diamonds). Closed symbols represent experimental data and open symbols are from molecular modeling simulations.

DETAILED DESCRIPTION OF THE INVENTION

Reference will now be made in detail to presently preferred compositions or embodiments and methods of the invention, which constitute the best modes of practicing the invention presently known to the inventors.

As used herein "linking ligand" means a chemical species (including neutral molecules and ions) that coordinate two or more metals resulting in an increase in their separation, and the definition of void regions or channels in the framework that is produced. Examples include 4,4'-bipyridine (a neutral, multiple N-donor molecule) and benzene-1,4-dicarboxylate (a polycarboxylate anion).

As used herein "non-linking ligand" means a chemical species that is coordinated to a metal but does not act as a linker.

As used herein "guest" means any chemical species that resides within the void regions of an open framework solid that is not considered integral to the framework. Examples include: molecules of the solvent that fill the void regions during the synthetic process, other molecules that are exchanged for the solvent such as during immersion (via diffusion) or after evacuation of the solvent molecules, such as gases in a sorption experiment.

As used herein "charge-balancing species" means a charged guest species that balances the charge of the framework. Quite often this species is strongly bound to the framework, i.e. via hydrogen bonds. It may decompose upon evacuation to leave a smaller charged species (see below), or be exchanged for an equivalently charged species, but typically it cannot be removed from the pore of a metal-organic framework without collapse.

As used herein "space-filling agent" means a guest species that fills the void regions of an open framework during synthesis. Materials that exhibit permanent porosity remain intact after removal of the space-filling agent via heating and/or evacuation. Examples include: solvent molecules or molecular charge-balancing species. The latter may decompose upon heating, such that their gaseous products are easily evacuated and a smaller charge-balancing species remain in the pore (i.e. protons). Sometimes space-filling agents are referred to as templating agents.

As used herein "accessible metal site" means a site in a metal cluster and, in particular, a position adjacent to a metal in a metal cluster available for a chemical moiety such as a ligand to attach.

As used herein "open metal site" means a site in a metal cluster and, in particular, a position adjacent to a metal in a metal cluster from which a ligand or other chemical moiety has been removed, rendering that metal cluster reactive for adsorption of a chemical species having available electron density for attachment to the metal cluster and, in particular, a metal in the metal cluster.

As used herein "metal cluster" means any metal containing moiety present in a metal-organic framework. This definition embracing single metal atoms or metal ions to groups of metals or metal ions that optionally include ligands or covalently bonded groups.

Several MOFs have open metal sites (coordinatively unsaturated) that are built into the pore "walls" in a repeating, regular fashion. These metal sites, such as those found in Cu-BTC or MIL-100, have been shown to impart catalytic activity to the materials. The partial positive charges on the metal sites in MOFs also have the potential to enhance general adsorption properties. This has often been discussed as a strategy for increasing hydrogen adsorption in MOFs.

The MOFS that are useful in the present invention have accessible metal sites. Among such MOFS are Cu-BTC, a.k.a., HKUST-1, Zn-MOF-74, Co-CPO-27, Ni-CPO-27, Mg-DOBDC, Cu(F-pymo), Pd(F-pymo), Pd(H-pymo), Pt/Y MOF, Pt/Gd MOF, Dy-btc, $M_3(Co(CN)_6)_2$—"Prussian Blue" compounds, $NaNi_3(OH)(SIP)_2$, Mn-BTT-MOF, MOF-505, UMCM-150, $Zn_3NTB$, Cd-aptz, Er-PDA, $Cu_2$-bpz, and Mn-ndc. The preparation of these MOFS is set forth in the scientific literature.

Cu-BTC has been extensively studied both experimentally and theoretically. (BTC is 1,3,5-benzenetricarboxylate). It has a face-centered cubic crystal structure and contains an intersecting 3D system of large square-shaped pores (9×9 Å) composed of paddle-wheel units assembled from two copper atoms and four benzenetricarboxylate (BTC) groups. The structure of Cu-BTC has two kinds of domains: tetrahedron side pockets (~5 Å diameter with 3.5 Å windows) and large square-shaped channels. The unit cell has a free volume of 66% and a BET surface area ranging from 1200 to over 2000 m2/g.

Mn-BTT MOF is $[Mn(CH_3OH)_6]_3[(Mn_4Cl)_3BTT_8(CH_3OH)_{12}]_2 \cdot 42CH_3OH$ where ($BTT^{3-}$) is 1,3,5-benzenetristetrazolate. More information about Mn-BTT MOF can be found in a paper in J. AM. CHEM. SOC. 2006, 128, 16876.

MOF-505 is synthesized by the solvothermal reaction of 3,3',5,5'-biphenyltetracarboxylic acid ($H_4$bptc; 25 mg, 0.076 mmol)[6] and $Cu(NO_3)_2 \cdot (H_2O)2.5$ (52 mg, 0.22 mmol) in N,N-dimethylformamide (DMF)/ethanol/$H_2O$ (3:3:2 v/v/v) at 658° C. for 24 hours gave green, blockshaped crystals (47 mg, 86% yield based on $H_4$bptc). The compound has been formulated as $[Cu_2(bptc)(H_2O)_2(dmf)_3(H_2O)]$ by elemental microanalysis and single-crystal X-ray diffraction studies. See Chen, B. L., Ockwig, N. W., Millward, A. R., Contreras, D. S., Yaghi, O. M. Angew. CHEM. 2005, 44, 4745.

$[Cu(F-pymo)_2(H_2O)_{1.25}]_n$, where F-pymo is (5-fluoropyrimidin-2-olate), can be prepared by taking a water/ammonia (11:2) solution (10 mL) containing $Cu(NO_3)_2 \cdot 3H_2O$ (2 mmol, 0.48 g) was added dropwise to 5-fluoro-2-hydroxypyrimidine (4 mmol, 0.46 g) dissolved in 10 mL of water-ammonia (11:2) under stirring. See, Navarro, J. A. R., Barea, E., Rodriguez-Dieguez, A., Salas, J. M., Ania, C. O., Parra, J. B., Masciocchi, N., Galli, S., Sironi, A. J. AM. CHEM. SOC. 2008, 130, 3978.

$NaNi_3(OH)(SIP)_2$ where SIP is 5-sulfoisophthalate, can be prepared by hydrothermal synthesis of $NiOH_2$ with the sodium form of SIP in water titrated with hydrochloric acid at 180° C. for 2 days. See Forster, P. M., Eckert, J., Heiken, B. D., Parise, J. B., Yoon, J. W., Jhung, S. H., Chang, J.-S., Cheetham, A. K. J. AM. CHEM. SOC. 2006, 128, 15578.

MOF-72 is $Cd_3(1,3-BDC)_4 \cdot (Me_2NH_2)_2$: MOF-72 (where 1,4-BDC is 1,4-benzenedicarboxylate). MOF-72 can be prepared by the following procedure that is set forth in Rosi, N. L.; Kim, J.; Eddaoudi, M.; Chen, B.; O'Keefe, M.; Yaghi, O. M. J. AM. CHEM. SOC. 2005, 127, 1504. A solid mixture of 1,3-benzenedicarboxylic acid ($H_2$-1,3-BDC) (24 mg, 0.145 mmol) and Cd—$(NO_3)_2$·$4H_2O$ (22.20 mg, 0.072 mmol) was dissolved in DMF (1 mL). The resulting solution was transferred into a Pyrex tube by pipet. To the solution was added a $CH_3NH_2$/$H_2O$/DMF solution (0.1 mL) prepared by diluting 40% aqueous $CH_3NH_2$ (1 mL) with DMF (50 mL). The tube was frozen in a $N_2$(1) bath, evacuated (200 mTorr), flame-sealed, and heated to 140° C. at a rate if 5° C./min for 50 h and then cooled to room temperature at a rate of 2° C./min. Colorless rod-shaped crystals of the product were formed, collected, washed with DMF (3 mL), and air-dried (24 mg, 31% based on $H_2$-1,3-BDC)

In our experiment, we fully dehydrated/desolvated a CuBTC sample. This left the sample with all metal sites open. We then exposed the sample to a carefully dosed amount of water vapor (between 0.5 and 1 water per Cu) and then performed a $CO_2$ adsorption isotherm. As can be seen in the attached FIGURE, the amount of $CO_2$ adsorbed on a hydrated sample is higher than the dehydrated or dry sample. One can also see in the FIGURE that the simulated and experimental results match except for a slight offset. We performed experimental adsorption measurements of $CO_2$ in Cu-BTC with different levels of hydration. Cu-BTC was synthesized according to the recipe given by Chui et al. The as-synthesized crystals were activated at a temperature of 448.15° K for complete removal of solvent molecules. Four different samples were prepared from the activated crystals. The first sample was the completely dehydrated Cu-BTC which was not exposed to any further treatment. The other three samples were hydrated to varying degrees by exposing them to different levels of humidity. The first hydrated sample was fully saturated with water, the second one had an 8% (w/w) loading of water, and the third one had a 4% (w/w) loading of water. Note that 8% water loading corresponds to one water molecule per each copper atom, and 4% corresponds to one water molecule per two copper atoms. $CO_2$ adsorption isotherms were measured.

The experimental isotherms were produced. Over most of the pressure range examined, the samples with 4% or 8% water adsorb more $CO_2$ than the completely dehydrated sample. The fully hydrated Cu-BTC adsorbs less $CO_2$ than the other samples at all pressures, which is not surprising, since the pores are full of water molecules. 4% corresponds to half of the open-metal sites occupied by water. It is noted that 4% water is better than 8% (all sites occupied), and it is clear that pre-adsorption of water can be used to tune the affinity of the material for $CO_2$. In addition, the experiments validate the simulation prediction qualitatively, although there is not quantitative agreement. Solvent molecules can be present in two forms in the pores of a MOF. In one form, they are not bonded to any framework atom and simply occupy the available space in the pores, and in this form they are expected to be mobile. In the second form, on the other hand, unsaturated metal atoms are coordinated to the solvent molecules and solvent molecules are localized. For instance, in MOF11, water molecules are present in both forms as explained above and the TGA analysis shows two distinct drops for the release of water molecules by increasing temperature. The second drop in the TGA belongs to the coordinated water molecules which are freed at a higher temperature indicating that a higher energy is required to break the coordination bond between the water molecules and the metal atoms.

While the evacuation of solvent molecules is essential to maximize the sorption capacity, capturing $CO_2$ from flue gas occurs at ambient conditions and available pore volume is not a major factor at these conditions. Thus, at these conditions the interaction of coordinated solvent molecules with sorbate molecules can also be a determining factor for the adsorption of sorbate molecules.

Besides the adsorption, these results are also important in terms of regulating the desorption process by controlling the amount of a second molecule since water can easily replace $CO_2$ in Cu-BTC as its concentration increased.

The invention claimed is:

1. A process for preparing a treated metal organic framework having increased capacity for gas storage compared to an untreated metal organic framework, said process comprising:
    a) selecting an activated metal organic framework characterized by having pore openings with a diameter and coordinately unsaturated metal sites; and
    b) exposing said activated metal organic framework to a metal site titrant for a sufficient period of time for about one-half of said open metal sites to be occupied by water and in which the metal site titrant is coordinately bound to a previously coordinately unsaturated metal site.

2. The process of claim 1 wherein said activated metal organic framework is selected from the group consisting of Cu-BTC, HKUST-1, Zn-MOF-74, Co-CPO-27, Ni-CPO-27, Mg-DOBDC, Cu(F-pymo), Pd(F-pymo), Pd(H-pymo), Pt/Y MOF, Pt/Gd MOF, Dy-btc, $M_3(Co(CN)_6)_2$—"Prussian Blue" compounds, $NaNi_3(OH)(SIP)_2$, Mn-BTT-MOF, MOF-505, UMCM-150, $Zn_3NTB$, Cd-aptz, Er-PDA, $Cu_2$-bpz, and Mn-ndc.

3. The process of claim 1 wherein a gas subject to said gas storage by said treated metal organic framework is selected from the group consisting of carbon dioxide, nitrogen, carbon monoxide, hydrogen, methane, oxygen, ethane, propane, propylene, ethylene, acetylene, hydrogen cyanide, and oxides of nitrogen and sulfur.

4. The process of claim 1 wherein said exposure of said activated metal organic framework to said metal site titrant causes said increased capacity to be between about 60 wt % and about 100 wt % as compared to said untreated metal organic framework.

5. The process of claim 1 wherein said activated metal organic framework is exposed to said metal site titrant for a period of time from several minutes to several hours.

6. The process of claim 1 wherein said activated metal organic framework comprises Cu-BTC, Zn-MOF-74, Ni-COP-27, Co-CPO-27, or Mg-DOBDC.

7. A treated metal organic framework having increased capacity for gas storage comprising:
    an activated metal organic framework characterized by having pore openings with a diameter and open metal sites; and
    a metal titrant coordinatively bound to an open metal site wherein about one-half of said open metal sites are occupied by water.

8. The treated metal organic framework of claim 7 wherein said activated metal organic framework is selected from the group consisting of Cu-BTC, HKUST-1, Zn-MOF-74, Co-CPO-27, Ni-CPO-27, Mg-DOBDC, Cu(F-pymo), Pd(F-pymo), Pd(H-pymo), Pt/Y MOF, Pt/Gd MOF, Dy-btc, $M_3(Co(CN)_6)_2$—"Prussian Blue" compounds, $NaNi_3(OH)(SIP)_2$, Mn-BTT-MOF, MOF-505, UMCM-150, $Zn_3NTB$, Cd-aptz, Er-PDA, $Cu_2$-bpz, and Mn-ndc.

9. The treated metal organic framework of claim 7 wherein a gas subject to said gas storage by said treated metal organic framework is selected from the group consisting of carbon dioxide, nitrogen, carbon monoxide, hydrogen, methane, oxygen, ethane, propane, propylene, ethylene, acetylene, hydrogen cyanide, and oxides of nitrogen and sulfur.

* * * * *